Aug. 4, 1959 J. C. KARLSON 2,898,462

DEMODULATOR

Filed Jan. 3, 1955

INVENTOR.
JOHN C. KARLSON
BY

ATTORNEY 2,898,462

DEMODULATOR

John C. Karlson, Brooklyn, N.Y., assignor to Bendix Aviation Corporation, Teterboro, N.J., a corporation of Delaware Application January 3, 1955, Serial No. 479,326

11 Claims. (Cl. 250—31)

This invention pertains to a demodulator and more particularly to a magnetic amplifier demodulator which utilizes transistor control.

The present invention is an improvement over copending patent application, Serial No. 459,488, now Patent No. 2,797,384, assigned to the assignee of the present invention.

An important object of the invention is to provide a novel demodulator employing transistor control.

Another object of the invention is to provide a novel transistor controlled magnetic amplifier demodulator.

Another object is to provide a novel discriminator utilizing transistor control of magnetic amplifier elements.

Another object is the provision of a novel discriminator utilizing saturable reactor elements with reset windings having transistor circuit operating voltage control.

Another object is the provision of a novel transistor controlled magnetic amplifier operatively responsive to extremely low level signals.

A further object of the invention is to provide a novel transistorized magnetic amplifier demodulator with greater efficiency.

A further object is the provision of a novel discriminator having improved efficiency and a reduction in the amount and cost of components utilized.

The present invention contemplates a demodulator utilizing a pair of magnetic amplifier elements, each having a core with a reset winding and a gate winding thereon energizable by a predetermined frequency. The signal input is fed from a coupling transformer to the reset windings via a transistor which is coupled to said source of excitation by way of the reset windings. An arrangement of resistors in the transistor circuit has values to establish the operating parameter of the transistor for obtaining the desired operating voltage of the reset windings. The demodulator converts low level modulated carrier voltages into proportional differential unidirectional voltages at a higher level and of a polarity depending upon the phase relation of the input signal to the reset voltage.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and not to be construed as defining the limits of the invention.

Figure 1:
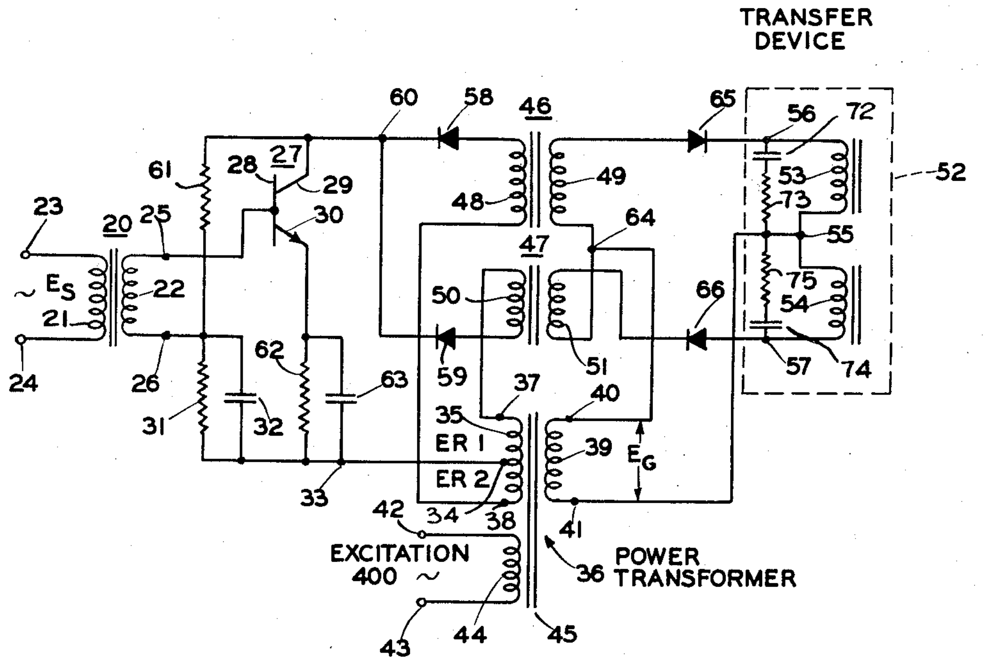
Fig. 1 is a representative schematic diagram of the magnetic amplifier demodulator.

Referring to the drawings, and more particularly to Fig. 1, there is shown a coupling or input transformer 20 having a primary winding 21 and a secondary winding 22, said primary winding being connected to terminals 23 and 24, which are connectible to a signal input. The secondary winding 22 has terminals 25 and 26.

A transistor 27 has a base 28, a collector 29, and an emitter 30, said transistor in the present showing being of the N–P–N type; but it is to be understood that other transistor types may be employed. The base 28 of the transistor is connected to terminal 25, which is one side of the input or coupling transformer, while the opposite side of the coupling transformer has terminal 26, which is connected by a parallel circuit consisting of a resistor 31 and a capacitor 32, to terminal 33, which in turn is connected to an electrical midpoint 34 of the reset voltage secondary winding 35 of a power transformer 36, said secondary also having terminals 37 and 38. The secondary 35 supplies reset voltage for a pair of saturable reactors. A gate voltage secondary winding 39 supplies a gating voltage at terminals 40 and 41. An excitation voltage of a predetermined frequency, such as 400 cycles, is connected to terminals 42 and 43 of the primary winding 44 of the power transformer 36, which is shown having a core 45.

A pair of saturable reactor elements 46 and 47, each have a core and reset and gate windings. Saturable reactor 46 has reset winding 48 and gate winding 49, while the saturable reactor element 47 has reset winding 50 and gate winding 51.

A transfer device 52 has differential output windings 53 and 54 with an electrical mid-tap 55 being connected intermediate one end of each of said differential output windings, with the opposite ends of said windings 53 and 54 being connected to terminals 56 and 57 respectively. A series circuit consisting of a capacitor 72 and a resistor 73 is connected between terminals 56 and 55 with a similar series capacitor 74 and resistor 75 connected between terminals 57 and 55.

The electrical midpoint or midtap at terminal 34 of the reset voltage secondary winding is connected to the terminal 26 via the parallel resistor 31 and capacitor 32 as explained heretofore. The opposite ends of the reset voltage secondary winding 35 are connected respectively to one side of the reset windings 48 and 50 of the saturable reactor elements to provide reset voltages $E_{R1}$ and $E_{R2}$, respectively, while the opposite ends of said reset windings are connected respectively to diodes 58 and 59 which have their cathodes connected together at terminal 60. Terminal 60 is connected to collector 29 of the transistor and also to one end of resistor 61, which has its opposite end connected to the terminal 26 of the coupling or input transformer secondary winding 22. The emitter 30 of the transistor is connected to a resistor 62 which is connected in parallel with the capacitor 63 with the opposite ends of said resistor and capacitor being electrically connected to terminal 33 which is in common with the mid-point 34 of the reset voltage secondary winding 35.

The terminal 40 of the gate voltage secondary winding 39, is connected to an electrical mid-point terminal 64 which in turn is connected to one side of each of the gate windings 49 and 51. The opposite ends of gate windings 49 and 51 are connected, respectively, to diodes 65 and 66, with the cathode of diode 65 being connected to terminal 56 of the transfer device, and the plate of the diode 66 being connected to terminal 57 of the transfer device.

The signal voltage $E_S$ impressed across terminals 23 and 24 may come from any suitable source, such as a vacuum tube, a transistor, or a magnetic amplifier, or the signal voltage may come directly from a synchro or other sensor which produces a carrier frequency signal. The carrier frequency signal is of the same frequency as the excitation voltage impressed on the primary 44 of the power transformer 36.

While the N–P–N type of transistor is shown in Fig. 1, the type P–N–P transistor may also be used in lieu of the N–P–N type transistor. However, when employing te P–N–P type transistor, each of the diodes 58 and 59 would be inverted, with all other circuit connections remaining as shown in Fig. 1.

To obtain discrimination with a signal input and using a single transistor, a center-tap voltage source is used so that either diode 58 or diode 59 is conducting at a given instant. With the N–P–N type transistor, the forward direction of the diodes are both connected together and to the collector of the transistor so that at a given instant diode 58 conducts, followed on the other half cycle by conduction of diode 59. The voltage at terminal 37 is 180° out of phase with the voltage at terminal 38, with respect to mid-point terminal 34. Because of the center tap secondary winding 35, it is necessary to reverse the direction of gate winding 51 and have the forward direction of diode 66 toward the gate winding 66 as shown. With this arrangement, the reset windings are sequentially energized. Accordingly, the gate windings will be sequentially conducting at a level determined by the amplitude or level of the respective voltages in the reset windings. As the reset winding voltage level increases, the gate winding voltage level decreases.

In the circuit shown, the value of the reset voltage in windings 48 and 50 is approximately 50% of the voltage required for complete cut-off in the gate winding. This indicates that as soon as a signal is impressed at the base 28 of the transistor, a relatively large change of conductance will occur in the transistor circuit causing the voltages in a given reset winding to rise to full 100%, while the voltage in the other reset winding will drop to zero at the same time. For a given input signal amplitude, a linear increase or decrease in voltage in the respective reset windings will occur. An increase in voltage in one reset winding will cause a corresponding decrease in voltage in the associated gate winding circuit, while at the same instant the voltage in the other reset winding will decrease while the voltage in its associated gate winding will increase.

The reset and gate windings may also be referred to as the control and load windings respectively.

When there is no signal, and the primary 44 of the power transformer 36 is energized, the voltages $E_{R1}$ and $E_{R2}$ provide power for the reset windings, and the voltage $E_G$ provides power for the gate windings.

When the power transformer is excited, but at a "no signal" condition, the values of the emitter resistor 62 which is bypassed by the condenser 63 to establish the suitable bias for the transistor, and the values of resistors 61 and 31 with its parallel capacitor 32 are such that they provide a reset voltage compatible with the gate voltage so that there is a desirable quiescent current flowing in the control coil of the output stage, whereby a balanced condition exists in output windings 53 and 54 of the transfer device; and, consequently there is no output since there is no voltage differential in said windings 53 and 54. Further, when the excitation voltage is applied to the power transformer and there is a "no signal" condition, the diodes 58 and 59 in the collector circuit are fed by voltages 180° apart, so that a pulsating direct current or unidirectional current is applied to the collector of the transistor. At "no signal" condition, resistors 61 and 31 determine the quiescent voltage and current values in the collector circuit because resistors 61 and 31 have values that provide a feedback loop to establish a desirable quiescent or static condition, whereby there is no electrical unbalance or output from the transfer device.

Resistors 61, 31, and 62 have values such that the parameter of the transistor is predetermined to obtain the desired reset voltage for reset windings 48 and 50. The values of the resistors 61, 31, and 62 establish the operating parameter of the transistor for obtaining desired current flow in the reset windings for controlling the operating voltage of said reset windings.

The quiescent current in the output windings is determined by the reset voltage present in the reset circuit, which includes resistors 61, 31 and 62 along with the center tapped secondary transformer winding 35, the reset coils 48 and 50 of the saturable reactor elements 46 and 47, the diodes 58 and 59 and the transistor circuit. Current flows through one or the other of the diodes 58 and 59, depending upon the polarity of the excitation voltage in relation to the polarity of the center tapped terminal 34 of the secondary winding.

Assuming that there is no reset voltage and no signal, then with only the gate voltage impressed across the gate windings, and with the positive half cycle appearing at terminal 64, diode 65 will conduct, and on the other half cycle when terminal 55 is positive, diode 66 will conduct, and the cores of the saturable reactor elements 46 and 47, respectively, will sequentially saturate on their respective half cycles of energization.

Under another condition, when there is gating voltage and full reset voltage but with no signal, when reset winding 48 is conducting, the gate winding 49 has a high impedance and, consequently, a minimum amount of current will flow in the differential output winding 53; and when reset winding 50 is conducting, the gate winding 51 will have a high impedance and a minimum of current will flow in winding 54 of the transfer device. The balanced condition results in zero voltage output.

At a "signal" condition, when an input voltage is impressed across the terminals 23 and 24, the diode 58 or 59, depending on which one is conducting the in-phase voltage, will experience a rise in current; while the non-conducting diode of the pair of diodes will experience an inverse condition; so that the current flowing in one diode will increase while the current flowing in the other diode will decrease at the same time, producing an unbalance in the reset windings of the saturable reactor elements, thereby producing an unbalance in the output windings 53 and 54 of the transfer device accordingly. When the reset voltage is increased in one half of the demodulator, for instance in the top half as shown in Fig. 1, the gating voltage in that particular circuit will decrease. When the reset voltage has increased to reach a given amplitude, the gating voltage in that particular circuit will approximate zero; and the reverse is true in the other half of the demodulator where the reset voltage approximates zero and the gating voltage will be at maximum.

In a quiescent or static state which exists at "no signal" condition, the value of reset voltage will be such as to cause partial magnetization of cores of saturable reactors 46 and 47, and a quiescent current will flow through output windings in the same relationship. Since the latter currents are of equal amplitude, zero voltage output will obtain.

When a signal voltage is applied to the input of coupling transformer 20, the currents flowing through diodes 58 and 59 will increase or decrease depending upon the phase relationship of the signal to the excitation voltages at power transformer 36. For example, if the signal voltage is in phase with the excitation voltage flowing through diode 58, the result would be an increase of voltage appearing across reset winding 48 due to the impedance change of the transistor, while the reverse condition would simultaneously exist in the circuit of which diode 59 is a part, the overall effect being an unbalance of the currents in the output windings 53 and 54 of the transfer device. Full output would be experienced when the voltage across reset winding 50 approximates zero, the voltage across winding 48 having increased to a point where saturable reactor 46 operated at zero saturation. A reversal of signal voltage would produce a similar condition, except that the circuit including the reset winding and diode combination 50 and 59, respectively, would experience a rise in voltage as opposed to a decreasing voltage in the circuit including the reset winding and diode combination 48 and 58, respectively, the end effect being a reversal in the output circuit.

An example of operation of the device may be seen from the following: Assume that in the quiescent or static state, which is at "no signal" condition, and with the excitation voltage impressed across terminals 42 and 43 of the power transformer, each of the reset windings had an equal voltage drop of, let us say, 3.5 volts. With a gating voltage of 45 volts impressed across terminals 40 and 41 of winding 39, the current flowing in each of the differential output windings 53 and 54 has a value of, let us say, 4 milliamps. In this quiescent or static state it will be seen that the voltage drop across each of said windings 53 and 54 is balanced, and there will be no differential voltage appearing across the output coils of the transfer device. Now, let us assume that the phase and amplitude of the input signal is such that the voltage drop across the reset winding 48 is doubled so that the voltage drop now becomes 7 volts. At this condition the voltage drop across the reset winding 50 would be reduced by 3.5 volts or would now be zero volts. Under this condition, the output voltage across winding 54 would be doubled, as was the voltage across reset winding 48, so that the current in output winding 54 would now be 8 milliamps, or an increase of 4 milliamps. The current in output winding 53 would be reduced by 4 milliamps which would result in the current in output winding 53 being zero milliamps. This condition would obtain with full reset voltage of amplitude and phase providing maximum output across the differential output windings of the transfer device, or the total gating voltage of 45 volts, of course, minus the residual resistive drops.

Therefore, it will be seen that at a "no signal" condition, both sides of the demodulator are balanced, while at a "signal" condition, one side of the demodulator drives more than the other side depending on the phase of the input signal.

Figure 2:
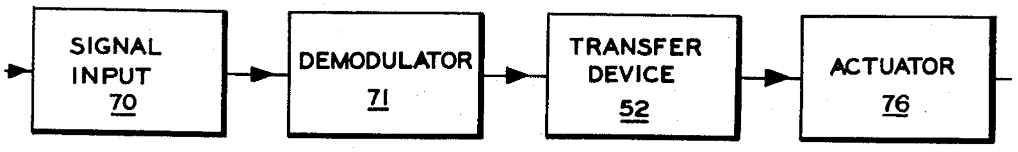
Fig. 2 is a block diagram of a servo amplifier showing the demodulator coupled between a signal input and an output device.

Referring to Fig. 2, there is shown a servo amplifier in block form having a signal impressed from any suitable signal input as represented by block 70. The signal input may come from any suitable source as mentioned hereinbefore, and is impressed upon the magnetic amplifier demodulator 71 which has its output coupled to the input of a transfer device 52, with said transfer device having its output coupled to an actuator 76. The output of the demodulator controls a transfer device 52, such as a differential relay, or any other suitable device for coupling to the actuator.

The actuator may be a motor, a piston, a magnetic clutch, lever arrangement or other form of actuator. The actuator may include a phase sensitive magnetic power amplifier for driving a two-phase servo motor, a solenoid clutch-operated servo using a constant speed shaft as a source of energy, a solenoid transfer valve to control hydraulic flow to a power piston, a differential direct current relay, or a suitable reactor.

The gating voltage and the reference voltage are shown as being taken from secondary windings of a 400 cycle frequency source of fixed amplitude for excitation of the reset windings and gate windings. The frequency of the reset and gating voltages may be of any suitable frequency which will operate in conjunction with a signal input having a carrier frequency of like periodicity. The saturable reactors have certain windings thereon which are coupled via a transistor to the modulated signal source so that certain other of said windings, namely the gate windings, may be coupled to a suitable transfer device whose operative polarity is a function of the phase relation of the modulated signal source and the source of predetermined frequency for excitation of the windings connected to the reference voltage and gating voltage.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A demodulator having a pair of saturable reactor core elements each with a reset and a gate winding thereon, a transistor having a base, collector and emitter, an output winding having a mid-tap, an excitation source of predetermined frequency having a first winding with a mid-tap and a second winding, said first winding having its outer legs connected respectively to one side of each reset winding, the other side of said reset winding each having a diode serially connected therewith and with the opposite sides of both of said diodes being connected to the collector to provide greatest conductivity of both diodes in the same direction, an impedance network connected between said collector and said emitter and the mid-tap of said first winding, a pair of signal input terminals provided at a selected point in said impedance network intermediate said collector and said emitter and the base, and a diode connected between the outer leg of each gate winding and the outer leg of said output winding, said diodes being poled for demodulating said amplified signal input when said gate windings and said output windings are connected to said excitation source.

2. A discriminator demodulator having a pair of saturable reactor core elements each with a reset and a gate winding thereon, a transistor having a base, collector and emitter, an output winding having a mid-tap, a first winding with a mid-tap and a second winding connected to a source of fixed frequency alternating current, said first winding having its outer legs connected respectively to one side of each reset winding, the other side of said reset winding each having a diode serially connected therewith with the opposite sides of both of said diodes being connected to the collector to provide greatest conductivity of both diodes in the same direction, an impedance network connected between said collector and said emitter and the mid-tap of said first signal source first winding, a signal input terminal provided at an intermediate point in said impedance network, a second signal input terminal at the base, and a diode connected between the outer leg of each gate winding and the outer leg of said output winding, said diodes being connected in opposition for demodulating said amplified signal.

3. A discriminator demodulator having a pair of saturable reactor core elements each with a control winding and a load winding thereon, a center tap output winding, a transistor having a base, collector, and emitter, a source of excitation of predetermined frequency having a first excitation winding with a mid-tap and a second excitation winding, said load windings being connected to provide a mid-tap, said second excitation winding being connected between the mid-taps of said load and output winding, an impedance network connected between said collector and said emitter to provide the operating parameter of said transistor and with one point of the impedance network being connected to the mid-tap of said first excitation winding to provide a control voltage, signal input terminals provided at the base of said transistor and a second point of said impedance network, the outer legs of said first excitation winding being connected respectively to one leg each of said control windings, a pair of diodes, each of the remaining legs of said control windings being connected to one of said diodes, with said diodes being connected to said collector with the greatest conductivity of both diodes being in a single direction for discriminating the phase of an input signal, and a second pair of diodes, one of said second pair of diodes each being operatively connected between an outer leg of said load and said output windings for demodulating a signal.

4. An amplifier having a pair of saturable reactor core elements each having a control and a load winding thereon, a pair of diodes, a transistor having a base, collector, and emitter, one leg of each control winding being connected to one of the like terminals of one of said diodes, the remaining leg of each control winding being connected, respectively, to one leg of a voltage source winding having a mid-tap, the remaining like terminals of said diodes being connected to said collector, a first impedance circuit serially connected between said emitter and said voltage source mid-tap, a second impedance circuit connected between said collector and said voltage source mid-tap, a first input terminal provided at a point of said second impedance circuit and a second input terminal connected with said base, output control windings having a mid-tap, a diode connected between a leg of each of said load windings and a leg of said output winding, the remaining legs of said load windings being connected to one leg of a secondary voltage source winding with another leg of said secondary voltage source winding being connected to said mid-tap of the output winding.

5. An amplifier having a pair of saturable reactors each with a core having a control and a load winding thereon, a transistor having a base, collector, and emitter, a first pair of diodes each having a like terminal connected to said collector, one leg of each control winding being connected to one of the terminals of the diodes, the remaining leg of each control winding being connected, respectively, to one leg of a voltage source winding having a mid-tap, an impedance circuit connected between said emitter and said voltage source mid-tap, a second impedance circuit connected between said collector and said voltage source mid-tap, said impedance circuits determining the quiescent state of said magnetic amplifier, an input signal terminal provided at a point of said second impedance circuit and a second input terminal connected with said base, output control windings having a mid-tap, a second pair of diodes with one diode thereof connected between one leg of each of said load windings and one leg of said output winding, the remaining legs of said load windings connected to one leg of a secondary voltage source winding with the remaining legs of the output winding connected to a second leg of said secondary voltage source.

6. A demodulator having a pair of saturable reactor core elements each having reset and gate windings thereon, transistor means having at least a base, collector and emitter, a pair of diodes each having a like terminal connected to one end of each of said reset windings and with the other like terminals of said diodes connected to said collector, a source of predetermined alternating frequency connected to other ends of said reset windings, impedance means having a predetermined value connected to said collector and emitter and having a terminal connected to an electrical point of said source, signal input terminals connected with said base and said impedance means at a point compatible to the operating parameter of said transistor means, a transfer device having windings, a second pair of diodes, one of said diodes being connected between an end of each gate winding and an end of each transfer device winding, with an electrical point of said gate windings and said output windings connected to a winding of said voltage source, whereby an alternating current signal impressed across said input terminals will result in a demodulated signal across the windings of the transfer device.

7. An amplifier having a pair of saturable reactor core elements each having a control and a load winding thereon, a transistor having a base, collector, and emitter, a voltage source having a mid-tap, a first pair of diodes, a pair of series circuits each including one of said control windings and one of said diodes with one end of each of said series circuits being connected together and to said collector and with the other end of each of said series circuits being connected across said voltage source, said diodes being poled similarly in regards to said collector, a first impedance circuit serially connected between said emitter and said voltage source mid-tap, a second impedance circuit connected between said collector and said voltage source mid-tap, a first input terminal provided at a point of said second impedance circuit and a second input terminal connected to said base, output windings having a mid-tap, a diode connected between a leg of each of the load windings and a leg of said output windings, the remaining legs of said load windings being connected to one leg of a secondary voltage source with an opposite leg of said secondary voltage source being connected to said mid-tap of the output windings.

8. A magnetic amplifier having a pair of saturable reactors each with a control and a load winding thereon, a transistor having a base, collector, and emitter, a first pair of diodes each having a like terminal connected to said collector, one leg of each control winding being connected to one of the terminals of the diodes, the remaining leg of each control winding being connected, respectively, to one leg of a voltage source winding having a mid-tap, a first impedance circuit connected between said emitter and said voltage source mid-tap, a second impedance circuit connected between said collector and said voltage source mid-tap, said impedance circuits determining the quiescent state of said magnetic amplifier, a first input signal terminal provided at a point of said second impedance network and a second input terminal connected with said base, output control windings having a mid-tap, a second pair of diodes with one diode thereof connected between one leg of each of said load windings and one leg of said output windings, the remaining legs of said load windings connected to one leg of a secondary voltage source winding with the remaining legs of the output windings connected to a second leg of said secondary voltage source.

9. An amplifier for converting low level modulated carrier input signal voltages into proportional differential unidirectional output signal voltages at a higher level and of a polarity depending upon the phase relation of a modulated input signal to an alternating current reset voltage, comprising a pair of saturable magnetic cores each having a reset and a gate winding thereon; reset circuit means including said reset windings, a single impedance current control means, an impedance network connected to said control means for setting the operating point of the current control means, sources of input signal and alternating current reset voltage energizing said reset circuit means, said reset voltage source including a centertap connected to said impedance network and discrete switching means serially connected with said reset windings between said single impedance current control means and said source of reset voltage and signal input for discriminating the phase of the input signal; and gating circuit means including said gate windings, a source of alternating current gating voltage connecting respective mid points of said gate windings and said source of gating voltage, output windings, and discrete switching means connecting said gate windings and said output windings and poled to provide the output signal.

10. A discriminator demodulator for converting modulated carrier input signals into proportional differential unidirectional output voltages of a polarity depending upon the phase relation of the signals to an alternating current reset voltage, comprising saturable reactor elements having reset windings energized by a reset voltage source and gate windings energized by an alternating current gating voltage source, switching means connected to said reset windings and to said gate windings, current control means connected to said switching means and reset windings, an impedance network connecting said current control means to the reset voltage source for setting the operating point of the current control means and receiving the signals, and output means connected to the switching means and gate windings and providing output voltages.

11. A discriminator demodulator for converting low level modulated carrier input signals into proportional differential unidirectional output voltages at a higher level, comprising saturable reactor elements having reset windings energized by an alternating current reset voltage source and gate windings energized by an alternating current gating voltage source, similarly poled switching means connected to said reset windings, current control means connected to said switching means, an impedance network connecting said current control means to the reset voltage source for setting the operating point of the current control means and receiving the signals, switching means connected to said gate windings and poled to provide demodulated output voltages of a polarity depending on the phase relation of the modulated input signals and the alternating current reset voltage, and output means connected to said last-mentioned switching means.

References Cited in the file of this patent

UNITED STATES PATENTS

| | | |
|---|---|---|
| 2,653,282 | Darling | Sept. 22, 1953 |
| 2,698,392 | Herman | Dec. 28, 1954 |

OTHER REFERENCES

Pittman: "Transistor Control of Magnetic Amplifiers," Radio Electronic Engineering, February 1954, pp. 13 to 15.